United States Patent Office.

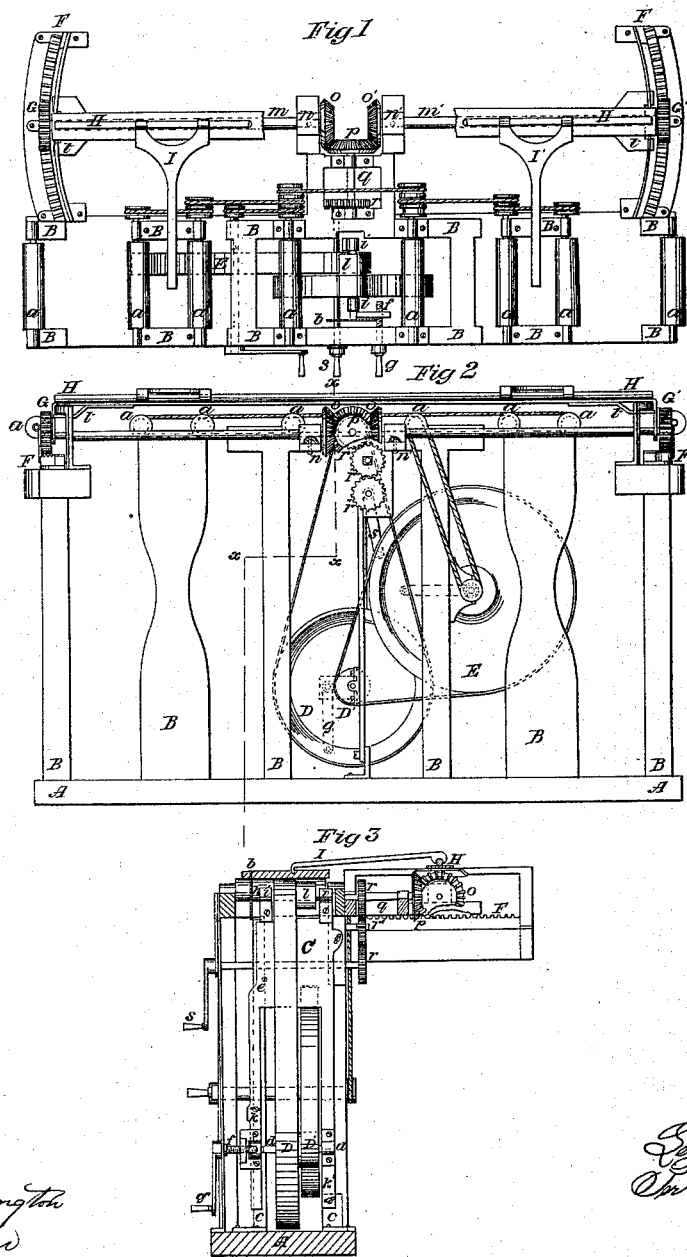
*L. Fossee,*
*Circular Sawing Machine,*
Nº 60,354.    Patented Dec. 11, 1866.
Witnesses:
Inventor:

IMPROVEMENT IN CIRCULAR SAWING MACHINES.

LEWIS FOSSEE, OF JEFFERSONVILLE, INDIANA.

Letters Patent No. 60,354, dated December 11, 1866;

*The Schedule referred to in these Letters Patent and making part of the same.*

TO ALL WHOM IT MAY CONCERN:

Be it known that I, LEWIS FOSSEE, of Jeffersonville, in the county of Clark, and State of Indiana, have invented a new and Improved Circular Sawing Machine; and I do hereby declare that the following is a full, clear, and exact description thereof, which will enable others skilled in the art to make and use the same, reference being had to the accompanying drawings, forming part of this specification, in which—

Figure 1 is a plan.
Figure 2 is a side elevation.
Figure 3 is a vertical transverse section, taken in the line $x$ $x$, fig. 2.

Similar letters of reference indicate like parts.

The nature of this invention consists in applying devices to operate in connection with a circular saw, for sawing plank with bevelled edges or with curved edges or sides when required, as well as straight edges and sides. The machine is particularly designed for use in ship-yards to edge plank of all kinds, and saw in curved lines and out-gauge, so that bottom plank of vessels may be finished upon the circular saw table. Plank of any thickness can be sawed, and I propose to arrange the saw to cut a bevel to the extreme limit usually required in ship building, say at an angle of $11\frac{1}{4}°$ with a square edge, or one inch on a four inch plank. This machine embodies two distinct principles of operation; first, by canting the saw at an angle to a perpendicular line, it cuts bevels as desired; and second, by sluing the plank around on a centre in the line of the saw arbor the sides or edges are sawed to the desired curve as it travels on rollers to the saw. An immense economy is effected by this machine, and great advantage in accuracy of execution as well as cheapness over hand-work.

A A represents the bed frame of the machine, and B B B are uprights for supporting the machinery, fig. 2. On the upper part on one side of the machine are a series of horizontal rollers, $a$ $a$ $a$ $a$, fig. 1, on which the plank to be sawed is placed, between the middle pair of which is the circular saw, $b$. The saw is hung upon an adjustable frame, C, fig. 3, which is so arranged as to cant the saw to any desired angle for cutting bevelled edges. This frame is fastened to the face of two standards, $c$ $c$, which are firmly fixed at the top and bottom, and stand on either hand of the large and small driving pulleys, D D', which are side by side on the shaft, $d$ $d$. The frame C, is pivoted on a screw-bolt, $e$, upon which it may be turned to cant the saw, $b$, by means of a set screw, $f$, on one side, which is operated by the crank, $g$. The saw arbor or shaft, $h$, hangs in boxes, $i$ $i$, on the upper end of the frame, C, and the driving pulleys, D D', are hung at a lower point on the same frame on the shaft, $d$ $d$, so that when the frame is moved by the screw, $f$, from side to side, the pulleys, D D', and the circular saw are moved together in line. In order to keep the frame, C, in place against the standards, $c$ $c$, on one side is a bolt, $k$, which sets and works in a horizontal slot, and near the bottom on the opposite side a bolt, $k'$, which sets and works in a vertical slot, both slots being made in the frame, C. On the saw-shaft, $h$, is a pulley, $l$, which takes motion from the pulley, D, by the side of the pulley, D', taking motion from the main driving pulley, E, fig. 2. Independent of these devices for regulating the position and operation of the saw for sawing straight or bevel edges, there are other arrangements of machinery for sawing the plank with curved edges, placed on the opposite side of the machine from the saw. Two horizontal cogged arcs or segment racks, F F', project from the upper side, at the ends, on a level with the rollers, $a$ $a$, on which traverse two small cog-wheels, G G', set on the ends of the radiating shafts, $m$, $m'$, the central ends of which rest in turning boxes, $n$ $n'$, and carry outside of the boxes on their extreme ends bevel gear-wheels $o$ $o'$, which mesh into a right angled bevel, $p$, between them, set on the horizontal shaft, $q$, which is driven by the train of cog-wheels, $r$ $r'$ $r''$, fig. 2, operated by the hand-crank, $s$. By turning the crank, $s$, the bevel, $p$, working into the wheels, $o$ $o'$, and moving them in opposite directions, simultaneously operates on the radiating shafts, $m$ $m'$, causing them to reciprocate or move together both ways on a common centre in a right line, by means of the cog-wheels, G G', which travel in the segment racks, F F'. Directly over and in line with the shafts, $m$ $m'$, and resting on pegs in a frame, $t$ $t$, which sets on the shafts at their ends, is a long round sliding bar or guide-rod, H H, which moves to and fro with the shafts, $m$ $m'$, when they are operated by the crank, $s$. The dogs, I I', are made to slide on the rod, H H, and hold the plank in place on the rollers, $a$ $a$, and will be made adjustable shorter or longer, as may be required. In connection with the sawing machine an ordinary grappling and hoisting apparatus will be placed near or over it for raising the plank from the ground, and placing it lengthwise on the rollers, $a$ $a$. When the plank is secured in its place the edge may be cut both straight and square if desired, by giving it rectilinear motion and running the saw vertically, but it is evident from the preceding description of the devices employed for canting the saw out of perpendicular, that a bevel edge can also be cut by it as required, and that the plank being held by the dogs, I I', will be slued around when the shafts, m m', are turned, and that as the plank shall travel in that position on the rollers, a a, the dogs, I I', sliding on the rod, H H, with it, the desired curve will be cut. I do not confine myself to the particular arrangement of all the parts of my invention as herein represented, since several modifications of the machine may be made in it without deviating from the essential principles of its operation, to wit: canting the saw for cutting bevels and sluing the plank around for cutting curves. In a full sized practical machine the saw will be made to cant on its shaft independently of the pulley, and the pivot or centre on which it turns will be its own centre. All the rollers will be portable except those at the ends of the machine, to remove or replace as desired, according to the nature of the stuff to be sawed, light or heavy, requiring more or less for support.

Having fully described the construction, use, and operation of my invention, what I claim as new and desire to secure by Letters Patent, is—

1. The adjustable slotted frame G, and set screw f, for canting the saw, arranged and operating substantially for the purpose specified.

2. Sluing the plank by means of the segment racks F F', wheels G G', radiating shafts, m m', guide-rod H, and dogs I I', substantially as described for the purpose specified.

LEWIS FOSSEE.

Witnesses:
   JNO. C. HOWARD,
   JAMES HOWARD.